April 7, 1953     W. F. DUCKSTEIN     2,634,358
COLLECTOR RING ASSEMBLY

Filed May 13, 1950     2 SHEETS—SHEET 1

Inventor
William F. Duckstein
By Wilkinson, Huxley, Byron & Hume
Attorney

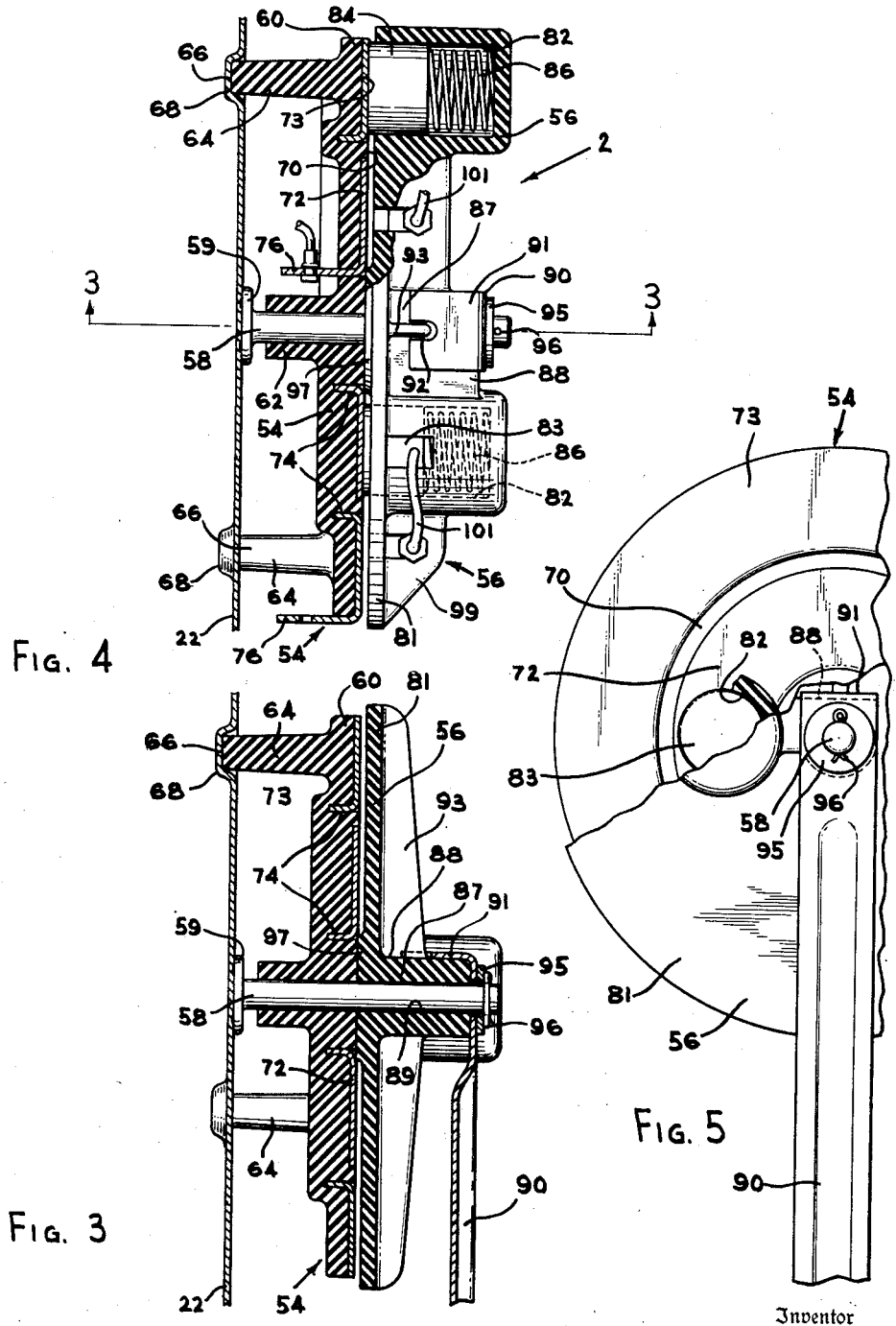

Patented Apr. 7, 1953

2,634,358

UNITED STATES PATENT OFFICE 2,634,358

COLLECTOR RING ASSEMBLY

William F. Duckstein, Newton, Iowa, assignor to The Maytag Company, Newton, Iowa, a corporation of Delaware Application May 13, 1950, Serial No. 161,882

7 Claims. (Cl. 219—19)

The invention relates to collector ring assemblies of improved construction for supplying electrical energy to rotatable apparatus, and more particularly to a collector ring assembly which may be rotated about a slightly varying axis.

When supplying electrical energy to rotatable apparatus it is necessary to provide slip rings or the like at some point in order to permit relative movement between the supporting structure and the rotatable member. If the slip rings are mounted on the rotatable member the brushes in contact therewith may be so mounted that they are held relatively stationary with respect thereto. Heretofore it has been necessary to provide rather elaborate means for holding the brushes and slip rings in their desired position so that relative shifting movement or misalignment cannot take place and, under certain conditions, this requires relatively expensive machining and fitting operations. Also, when a third or neutral wire is necessary, such as, for example, when the rotatable member must be grounded, an additional slip ring and brush is required.

With a construction of the proposed type, as will be hereinafter more fully described, it is possible to mount a collector ring assembly on a rotatable member or drum in a relatively simple manner which does not require accurate alignment with respect to the supporting structure and when the rotatable member is normally insulated from ground it is possible to ground the same through the assembly without the use of an additional slip ring. This is accomplished by securing a metallic stub shaft or pin on the approximate axis of rotation of the rotatable member and mounting the collector ring assembly thereon and connecting the pin directly to ground through a flexible holding arm whose lower end is secured to the supporting structure.

This holding arm not only provides a means for grounding the rotatable member but in addition the upper end engages the stationary element or portion of the collector ring assembly carrying the brushes to prevent the same from rotating. By making the holding arm flexible it permits the brush holding portion of the assembly to move eccentrically with the slip ring carrying portion should the pin be mounted eccentric with respect to the true axis of rotation of the rotatable member and also prevents the brush holding portion from rotating therewith.

It is therefore an object of the invention to provide means for grounding the rotatable apparatus through a portion of the mounting means of the collector ring assembly.

It is still another object of the invention to provide a collector ring assembly which may be eccentrically mounted with respect to the true axis of rotation of a rotatable member with a flexible member connected thereto to permit slight eccentric displacement but to prevent rotation of one of the elements of the assembly.

It is yet another object of the invention to provide a collector ring assembly which is relatively simple in construction and eliminates the necessity for an additional slip ring when mounted on a rotatable member normally insulated from ground.

It is still another object of the invention to provide a collector ring assembly which may be formed from molded insulating material with a minimum number of parts and which does not require elaborate and expensive machining and assembly operations.

It is another object of the invention to mount a collector ring assembly on a single pin and which utilizes the backing springs for the brushes as a means for holding the assembly in its desired position.

Other objects, features, capabilities and advantages are comprehended by the invention as will later appear and as are inherently possessed thereby.

Referring now to the drawings:

Figure 3 is an enlarged vertical longitudinal partial sectional view taken on the line 3—3 of Figures 2 and 4;

Figure 4 is a horizontal sectional view taken on the line 4—4 of Figures 2 and 3; and, Figure 5 is an enlarged partial end view of the collector ring assembly shown in Figure 2 with parts broken away to show the slip rings.

Figure 1:
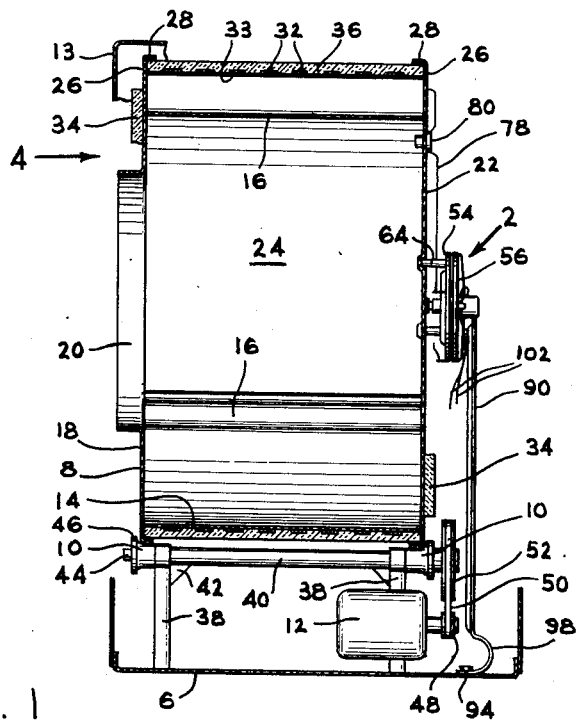
Figure 1 is a partial vertical sectional view of an automatic clothes drier to which the improved collector ring assembly is applied.
Figure 2:
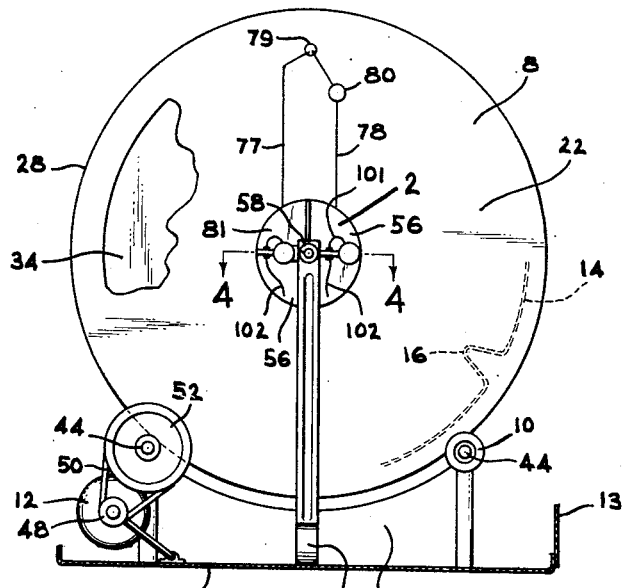
Figure 2 is an end elevational view of the drier shown in Figure 1.

Referring now more in detail to the drawings for one form of apparatus to which a collector ring assembly 2 embodying the features of the present invention may be applied, there is shown a clothes drier 4 having a metallic base structure or frame construction 6 which provides a support for a hollow, metallic clothes receiving rotatable member or drum 8 mounted for rotation about a horizontal axis within a cradle formed by four horizontally spaced hard rubber rollers 10, and rotated by means of an electric motor 12, in a manner as will be hereinafter more fully described. The drier further includes control mechanism (not shown) for automatically controlling the operation and duration of the drying cycle. The above apparatus may be enclosed in an outer casing 13 to present a smooth and pleasing appearance.

The horizontally mounted rotatable metallic drum 8 comprises an imperforate cylindrical wall 14, with parallel radially inwardly directed clothes elevating or lifting vanes 16 formed thereon, disposed between a vertical front wall 18, having a single centrally located access opening 20 therein, and a vertical substantially imperforate rear wall 22 spaced in parallel relation with the front wall, all being secured together to form a rigid unitary structure to define a clothes drying chamber 24. Each wall has identical flange portions 26 extending outward beyond the outer periphery of the cylindrical wall 14 which are rolled inwardly to form a pair of flat horizontal cylindrical supporting surfaces or rims 28 adapted to rest on the spaced rubber rollers 10 to provide the sole supporting means for holding the drum 8 in its horizontal plane.

In order to evaporate the moisture in the clothing within the chamber 24 heat must be applied thereto. In this modification, the preferred means for heating the chamber is in the form of an electrical heating element 32 formed by a single, flat, long, thin and relatively wide strip of stainless steel, or other material having somewhat similar characteristics. This heating element is preferably tightly wound in an open spiral to substantially cover the entire outer periphery of the imperforate cylindrical wall 14, and a thin layer of electrical insulation 33, such as, for example, asbestos or the like, is placed therebetween to prevent electrical contact with the drum. A heating element of this type is adapted to uniformly heat the entire periphery of the drum which, of course, heats the clothing in the chamber to drive off the moisture, or a high percentage thereof, and the over-all temperature of the entire heating element is reduced considerably, in fact, it may be reduced to a point below that which would normally cause ignition of the clothing should it remain in contact with the drum for any length of time, such as, for example, if the drive motor should fail and the drum stop rotating or for any other reason.

To improve the efficiency of the drier, insulating pads 34 may be attached to the outer surface of the front and rear walls, and a layer of thermal insulation 36 of any suitable dielectric type is wrapped and secured about the outer periphery of the heating element to totally enclose the same. Therefore, any lint shaken off of the clothing during the drying operation that may contact the exterior of the drum cannot accumulate in the heating element, thus an additional fire hazard is eliminated.

In order to support the rotatable drum 8 in its horizontal position there is provided a pair of similar, oppositely disposed and upwardly extending parallel webs 38 formed integral with the base structure 6 transverse to the horizontal axis of the drum and they are preferably positioned adjacent the front and rear walls 18 and 22 of the same. Bridging the upper outer ends of the opposite webs 38 there is mounted a pair of parallel horizontally spaced tubular members 40 disposed parallel with the drum and rigidly secured to the webs 38 by means of angle brackets 42 to provide a relatively simple rigid structure. These tubular members 40 journal horizontal shafts 44 which project outward beyond both ends of the tubular members and have the rubber supporting rollers 10 secured thereon in any suitable manner. In addition, each supporting roller has a radial projecting flange 46 to provide a thrust collar adjacent the outer portion of the flanges 26 on both of the headers, the same being relatively closely spaced thereto in such manner as to limit axial shifting movement of the drum when it is rotated about its horizontal axis.

Means for rotating the drum includes the drive motor 12, having a driving pulley 48 secured thereto, mounted for rotation on an axis parallel to the drum axis and connected by means of a belt 50 to a driven pulley 52 rigidly secured to a projecting end of one of the horizontal supporting shafts 44 adjacent one of the rollers 10. When the motor is energized the driving pulley 48 rotates one of the shafts 44 through the driven pulley 52. The weight of the drum on the driving pair of rubber rollers 10 insures a proper frictional drive between the engaging portion of the rollers and rims 28 whereby the drum is rotated about its horizontal axis at a considerable speed reduction, while the opposite shaft 44 carrying its rollers 10 merely acts as a rolling support.

With a drum and base construction of the above described type it is obvious that the assembly need not be aligned too accurately and close tolerances are not too necessary and that the drum may shift and wobble slightly during rotation of the same without effecting the operation of the drier.

Since the heating element 32 is carried on the outer periphery of the drum, means including a collector ring must be employed for energizing the same. In the illustrated form of the invention, as shown more clearly in Figures 3, 4 and 5, the collector ring assembly 2 is secured to the back portion of the rear wall 22 of the drum 8 and mounted on the approximate axis of rotation of the same. This collector ring assembly comprises a rotatable element or slip ring holder 54 and a relatively stationary element or brush holder 56 both coaxially mounted upon supporting means consisting of a stub shaft or mounting pin 58, which is rigidly secured to the back wall of the drum through a flattened head 59, in any suitable manner, to form a good electrical bond therewith. Both the slip ring and brush holders may be formed or molded from a phenolic resin or other material to provide separate unitary dielectric pieces.

The slip ring holder 54 comprises a relatively flat front disc member 60 having a cored hub 62 adapted to fit over the pin 58 and a plurality of inwardly projecting lugs 64, the outermost edges 66 of which are adapted to fit within the recessed portions provided by bosses 68 formed on the back wall 22 of the drum 8. The front face 70 of the slip ring holder 54 carries a pair of inner and outer, spaced, flat concentric slip rings 72 and 73, respectively, mounted coaxial with the stub shaft 58, the same being preferably provided with inwardly projecting cleats 74 so that the slip rings may be molded with the holder and are rigidly secured therein to form a unitary structure.

Each slip ring is provided with an integral lug or strap 76 which extends through the disc portion 60 of the base member and terminates adjacent the back wall of the drum. These two lugs are utilized as electrical terminals for a pair of conductors 77 and 78, respectively, extending radially therefrom along the back of the drum. The conductor 77 passes through an opening 79 in the back wall of the drum and is directly connected to one end of the heating element 32, while the opposite end of the heating element is connected to the other conductor 78 in series with a fixed temperature responsive thermostat or limit switch 80 secured to the rear wall adjacent the outer periphery of the drum. This thermostat is utilized to deenergize the heating element 32 when the temperature within the chamber 24 reaches or tends to exceed a predetermined safe value, and is responsive if the air in the chamber or the rear wall, either collectively or individually, exceeds a safe value.

The molded stationary element or brush holder 56 has a flat disc portion 81 adapted to be disposed adjacent the slip rings to cover the same to avoid accidental contact therewith. Also, the holder is provided with a pair of spaced recesses or pockets 82, opening through the face of the disc in the direction of the slip rings. Disposed within the recesses 82 are electric brushes 83 and 84 which have their projecting ends positioned to contact the slip rings 72 and 73, respectively. A compression type spring 86 is disposed within each recess in back of each brush to bias or force the brushes against the slip rings at all times. The brush holder is also provided with a hub portion 87 having a flat upper surface or shoulder 88 and a centrally located opening 89 therethrough adapted to receive the outer end of the stub shaft 58 to insure proper radial alignment of the brush holder with respect to the slip ring holder 54.

In a collector ring assembly constructed in this manner with the rotatable and stationary elements 54 and 56 mounted on the same shaft, it is obvious that relative radial shifting movement is obviated, thus assuring that each brush will be maintained in proper contact radially with its respective slip ring. In order to prevent the brush holder from rotating with the slip ring holder a vertical flexible holding arm 90 is provided which has an opening therein fitting over the outer projecting end of the stub shaft 58. The upper end 91 of the arm 90 is bent forwardly over the shoulder 88 on the hub 87 and its outer most portion is slit at 92 to engage opposite sides of a radial strengthening rib 93 on the outer face of the brush holder, while the lower end of this holding arm is rigidly secured by means of a bolt 94, or other suitable means, to the base 6 of the drier assembly. A washer 95 placed over the stub shaft 58 engages the holding arm 90 and all three elements mounted on the shaft 58 are limited in axial movement away from the drum by means of a cotter pin 96, or any other suitable locking or holding means, extending through the shaft. The brush holder is formed with a projecting shoulder 97 on the recessed side thereof to provide clearance between the same and the slip rings, thus eliminating rubbing contact between the disc portion 81 and the slip rings.

With a collector ring assembly constructed in this manner it is obvious that a relatively simple construction has been provided which has a minimum number of parts and that the compression springs 86 disposed in the recesses 82 in the brush holder 56 react in both directions to push the brushes against the slip rings and the brush holder 56, holding arm 90 and washer 95 in the direction of the cotter pin 96, and at the same time hold the ends 66 of the lugs 64 in the bosses 68 in the rear wall 22 of the rotatable member 6 to insure rotation of the slip ring holder.

For manufacturing reasons, it is not always possible or feasible without considerable additional expense, to mount the collector ring assembly on the true axis of the drum, therefore the vertical holding arm 90 is provided with an expandable bow or loop 98 near the base thereof. Thus, should the assembly be eccentrically mounted with respect to the true axis of rotation of the drum or with respect to the base the holding arm permits the assembly to wobble or move about the true axis of the drum, when it is rotated, while at the same time it will prevent the brush holder 56 from rotating therewith.

The horizontal strengthening rib 99 on the back of the disc 79 is provided with a pair of spaced slots to define junction points for the terminal ends of the brush leads 101 and the energy supply conductors 102.

When under some installations the rotatable member is insulated from the base structure, such as, for example, when the drum is mounted on insulating rollers, it is both desirable and necessary for the drum to be grounded to obviate any possibility of damage or injury to the operator should the heating element or other electrical means come in direct contact with the drum. This grounding of the rotatable member is very readily accomplished by means of the stub shaft 58 and the flexible holding arm 90, because the head of stub shaft is rigidly and electrically secured to the drum and the lower end of the holding arm is rigidly and electrically secured to the base member, and the outer end of the stub shaft is in electrical contact with the upper end of the holding arm through the pin and washer. This, of course, eliminates the necessity of adding an extra brush and slip ring and thereby reduces the over-all size of the assembly.

From the foregoing it can be seen that a relatively simple collector ring assembly has been provided which requires but a small number of parts and very little or no machining is required during the assembly of the same and that all parts may be stamped, blanked or molded in relatively simple operations. Also, an assembly has been provided which need not be accurately aligned with respect to the base structure to hold the brushes in contact with the slip rings and that the rotatable member may be grounded to the base construction through the mounting means for the assembly without the necessity of adding an additional brush and slip ring.

It is to be understood that two brushes may be substituted for the single brush on each slip ring, if desired for manufacturing reasons, and that the brush and slip ring holders may be reversed, i. e., the brush holder would be carried by the rotatable member and the slip ring holder would be made the stationary element.

While I have herein described and upon the drawings shown an illustrative embodiment of the invention, it is to be understood that the invention is not limited thereto, but may comprehend other constructions, arrangements of parts, details and features without departing from the spirit of the invention.

It is claimed:

1. In combination with a rotatable member, a base structure therefor, a collector ring assembly comprising a pair of members of non-conducting material for supporting cooperating collector ring and brush means, mounting means having electrical conducting relation with said rotatable member and carried thereby approximately on its axis of rotation, said mounting means having one of said members mounted thereon for rotation therewith and being journaled in the other of said members, and flexible means connected to and electrically engaging said mounting means and base to provide a ground connection and for holding the other of said members against rotation, said flexible means having an offset portion intermediate its ends to provide for variable displacement of said mounting means with respect to the axis of rotation of said rotatable member without affecting the cooperative relation of said collector ring and brush means.

2. Means for supplying electrical energy to a rotatable member, comprising a base structure therefor, a collector ring assembly having a rotatable element and a stationary element with slip rings carried by one of said elements and brushes mounted on the other of said elements, means including a pin secured to said rotatable member for coaxially mounting said rotatable and stationary members, a stop on said pin disposed outwardly from said stationary element, spring means for biasing said stationary element against said stop and for holding said rotatable element against said rotatable member, and a flexible holding arm for engaging said stationary element to prevent rotation of the same, said flexible holding arm having its ends connected to and electrically engaging said base and pin to provide a ground connection for said rotatable member through said pin.

3. A slip ring assembly for a rotatable member mounted on a base construction, comprising a stub shaft projecting from said rotatable member, a rotatable element engaging said rotatable member to rotate therewith, a stationary element in which said stub shaft is journaled whereby said stationary element is held in radial alignment with said rotatable element, cooperating slip rings and brushes carried by said rotatable and stationary elements, respectively, a flexible holding arm secured to said base and to said stationary element to prevent rotation of the same, said holding arm electrically engaging said stub shaft and said base for providing an electrical ground connection for said rotatable member through said stub shaft, and means for limiting axial movement of said elements.

4. In a collector ring assembly for a rotatable member normally insulated from a supporting base construction, comprising a stub shaft secured on said rotatable member along its approximate axis of rotation, a rotatable element and a stationary element mounted on said stub shaft, said rotatable element including an outer disc portion having a plurality of lugs extending therefrom to engage said rotatable member to space the same therefrom and to insure rotation therewith, said outer disc portion having a pair of slip rings secured in its outermost face, said stationary element including a front face having a pair of recesses therein for receiving brushes disposed opposite said slip rings, a flexible holding arm having its lower end secured to said base and its upper end disposed over and electrically engaging said stub shaft and engaging a portion of said stationary element to prevent rotation of the same about said stub shaft, said arm cooperating with said stub shaft to provide a ground connection for said rotatable member, means including a stop for limiting the axial movement of said elements, and spring means disposed in said recesses for urging said brushes into contact with said slip rings whereby said springs react through said elements to hold the rotatable element against said rotatable member and the stationary element against said stop.

5. In combination, a metallic supporting base construction, a metallic rotatable drum insulated from said base and mounted for rotation about its horizontal axis on said base, an electrical heating element carried by said drum, a stub shaft projecting outwardly from said drum at its approximate axis of rotation, a collector ring assembly mounted on said stub shaft, said collector ring comprising an inner rotatable element carrying slip rings thereon connected to said heating element and an outer stationary element carrying cooperating brushes for said slip rings, a flexible holding arm having its lower end secured to said base and its upper end engaging said stationary element to prevent rotation of the same, said holding arm electrically engaging said stub shaft and base to provide an electrical ground connection for said drum, and means for limiting axial displacement of said collector ring.

6. In combination, a metallic supporting base construction, a drum mounted for rotation about its horizontal axis on said base and electrically insulated therefrom, an electrical heating element carried by said drum to rotate therewith, a stub shaft secured to said drum and projecting outwardly therefrom at its approximate axis of rotation, a collector ring assembly mounted on said stub shaft, said assembly comprising an inner rotatable element having an outwardly directed face carrying slip rings therein which are connected to said heating element, and an outer stationary element having a recessed inner face for receiving brushes which cooperate with said slip rings, a flexible holding arm having its lower end secured to said base and its upper end engaging a portion of the outer side of said stationary element to prevent rotation of the same, said holding arm electrically engaging said stub shaft and base to provide an electrical ground connection for said drum, and means on said stub shaft for limiting axial movement of said assembly.

7. In combination, a metallic supporting base construction, a metallic rotatable drum insulated from said base by insulating rollers and mounted for rotation about its horizontal axis, means for rotating said drum, an electrical heating element carried by said drum, a stub shaft projecting outwardly from said drum at its approximate axis of rotation, a collector ring assembly mounted on said stub shaft, said assembly comprising a rotatable element and a relatively stationary element both mounted in associated relation with said stub shaft, said rotatable element including an outer disc portion having spacing means extending therefrom to engage said rotatable drum to insure rotation therewith and a pair of slip rings secured in its outermost face, said stationary element including a disc shaped front face for covering said slip rings and having a pair of recesses therein for receiving brushes disposed opposite said slip rings, a flexible holding arm having its lower end secured to said base and its upper end disposed to engage a portion of said stationary element to prevent rotation of the same about said stub shaft, said arm cooperating with said stub shaft to provide a ground connection for said drum, means including a stop for limiting axial movement of said elements, and spring means disposed in said recesses for urging said brushes into contact with said slip rings whereby said springs react through said elements to hold the rotatable element against said rotatable drum and said stationary element against said stop.

WILLIAM F. DUCKSTEIN.

REFERENCES CITED

The following references are of record in the file of this patent:

UNITED STATES PATENTS

| Number | Name | Date |
|---|---|---|
| 718,135 | Lester | Jan. 13, 1903 |
| 1,334,876 | Seymour | Mar. 23, 1920 |
| 1,381,243 | Seymour | June 14, 1921 |
| 1,468,419 | Seymour | Sept. 18, 1923 |
| 1,496,356 | Noonan | June 3, 1924 |
| 1,629,942 | Zeun | May 24, 1927 |
| 1,629,943 | Zeun | May 24, 1927 |
| 1,761,832 | Johansson | June 3, 1930 |
| 2,204,325 | Staley | June 11, 1940 |
| 2,313,481 | Rendano | Mar. 9, 1943 |
| 2,354,100 | Bowen | July 18, 1944 |

FOREIGN PATENTS

| Number | Country | Date |
|---|---|---|
| 610,594 | Great Britain | Oct. 18, 1948 |